United States Patent Office 3,378,437
Patented Apr. 16, 1968

3,378,437
ACARICIDAL AGENTS
Horst Arndt, Berlin-Schoneberg, and Walter Steinhausen, Grossburgwedel, Germany, assignors to Schering, A.G., Berlin, Germany
No Drawing. Filed Dec. 20, 1963, Ser. No. 332,255
Claims priority, application Germany, Jan. 18, 1963, Sch 32,614
2 Claims. (Cl. 167—30)

ABSTRACT OF THE DISCLOSURE

A method of treating plants with an acaricidal composition containing one or more compounds of the generic formula,

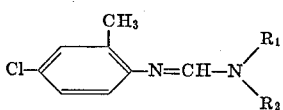

wherein $R_1$ is H or an alkyl radical having one to four C atoms, and $R_2$ is an alkyl radical of one to four C atoms, and their salts, with or without other pesticidal agents, in solid form for dusting powders, or in liquid or aerosol suspension for spraying or aerosol application.

---

This invention relates to acaricidal agents, and more particularly to compounds which are selectively toxic to acarids, such as mites in all stages of development.

We have found that basic compounds of the formula

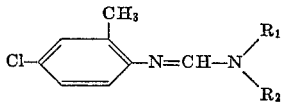

wherein $R_1$ is hydrogen or an alkyl radical having one to four carbon atoms, and $R_2$ is an alkyl radical of one to four carbon atoms, and their salts have good acaricidal effects, and are outstanding against acaride eggs.

The compounds of the invention differ from most known acaricidal compounds in being effective against the parasites in all stages of development so that a single treatment with a single compound may eradicate an entire acaride population. This effect is specific to compounds of the above formula. Even minor changes in the substituent of the benzene ring result in complete loss of the acaricidal effect, or at least in a substantial reduction of the effect.

The acaricidal agents of the invention are harmless to insects. They destroy mites without damaging insects that may prey on the mites.

The acaricidal agents of the invention are highly effective against mite eggs in their later stages of development. They are therefore useful in the treatment of plants long after their infestation by mites.

The acaricidal agents of the invention may be prepared by conventional methods. In a preferred procedure, an N-formylated mono- or dialkylamine is reacted with an equivalent amount of phosphorus oxychloride in the presence of an inert organic solvent at a temperature between 20 and 100° C., and the equivalent amount of 2-amino-5-chlorotoluene is added to the reaction mixture. The ensuing second reaction yields the amidinium salt which is converted to the free base by conventional methods. The best time and temperature to be selected for the second reaction varies somewhat for the several compounds of the invention, but is readily determined by preliminary small scale tests.

The following example is illustrative of specific conditions which will yield acceptable results, but it will be understood that the invention is not limited to the process by which the acaricidal agents are produced.

EXAMPLE 1

15.4 parts by weight of phosphorus oxychloride were slowly added with stirring to 7.4 parts by weight of dimethylformamide dissolved in 50 parts by weight of ethylene chloride. The addition period was about thirty to forty minutes and the temperature was allowed to rise to 45° C. To the solution then were subsequently added 14.2 parts by weight of 2-amino-5-chlorotoluene while stirring was continually maintained and the temperature of the reaction mixture was allowed to rise to 65° C. After completion of the 2-amino-5-chlorotoluene addition, the mixture was stirred for two additional hours at about 65° C.–70° C. Then the temperature of the solution was adjusted to about 5° C. by external cooling, and then a strong base such as sodium hydroxide solution or triethylamine was added with vigorous stirring to maintain the pH at 11–11.5. The ethylene chloride layer was separated, washed with water, and dried over sodium sulphate, followed by evaporation of the solvent under diminished pressure which yielded as residue 16.7 parts by weight of an oily liquid, nearly 85 percent of the theoretical amount; B.P. 156–157° C./0.4 mm. $n_D^{25}$:1.5885 and $d_4^{25}$:1.105.

The elementary analysis corresponded to that of the compound $C_{10}H_{13}N_2Cl$ [N-(2-methyl-4-chlorophenyl) N',N'-dimethylformamidine]: Found: C, 61.50%; H, 7.11%; N, 14.53%. Calculated: C, 61.06%; H, 6.66%; N, 14.26%.

Representative acaricidal agents of the invention when prepared by the above method have the following characteristic properties:

N - (2 - methyl-4-chlorophenyl)-
    N'-methylformamidine _____ M.P. 85–87° C.
N - (2 - methyl-4-chlorophenyl)-
    N',N'-dimethylformamidine __ B.P. 156–157° C./0.4 mm., $n_D^{25}$=1.5885, $d_4^{25}$=1.105.
N - (2 - methyl-4-chlorophenyl)-
    N',N'-diethylformamidine ___ Oil $n_D^{25}$=1.572, $d_4^{20}$=1.072.
N - (2 - methyl-4-chlorophenyl)-
    N'-n-propylformamidine _____ M.P. 73–75° C.
N-(2-methyl-4-chlorophenyl)-N',
    N'-di-n-propylformamidine ___ Oil $n_D^{25}$=1.5545, $d_4^{20}$=1.025.
N - (2 - methyl-4-chlorophenyl)-
    N'-isobutylformamidine _____ M.P. 81–82° C.
N - (2 - methyl-4-chlorophenyl)-
    N'-sec.-butylformamidine ____ M.P. 42–44° C.

The melting points indicated herein are uncorrected, and were taken on materials recrystallized from hexane.

The acaricidal compounds of the invention may be applied singly or in mixtures with each other and with other pesticidal agents. They may constitute the active ingredient of dusting compositions, or they may be applied to mites in fogging or spraying compositions. When incorporated in liquid compositions, the acaricidal agents of the invention may be dispersed in an inert liquid medium to form a suspension or emulsion. The salts of the formamidine derivatives of the invention with strong acids, such as hydrochloric acid, are soluble in water. The salts are specifically toxic to mites, and their aqueous solutions may be incorporated in liquid acaricidal compositions.

Solid compositions based on the acaricidal agents of the invention may include conventional solid diluents and carriers such as limestone, kaolin, chalk, talcum, attaclay and other clays. Surfactants when admixed to such compositions enhance their effectiveness in a manner known in itself.

The acaricidal properties of the formamidine derivatives of the invention, and the use of the compounds in the protection of plants against parasitic mites are illustrated in the following examples which also show the results of comparison tests performed with other compounds closely related to those of the invention but not encompassed within the scope of the appended claims.

EXAMPLE 2

Effects on acarides in the postembryonal stage and on ova

Bush beans in the late two-leaf stage and infected with spider mites of the species *Tetranychus urtica* Koch in all stages of development were sprayed with aqueous suspensions or emulsions of various formamidine derivatives and with aqueous solutions of formamidine derivative salts in different concentrations.

The liquids were applied to the potted plants while the same were standing on a rotating turntable. A spray gun equipped with a glass nozzle was employed. The pressure at the gun was 0.5 kg./cm.$^2$. The amount of liquid applied to three plants per pot was between 50 and 60 milliliters and was sufficient for complete watting of the plants. Excess liquid ran off in drops.

The lethal effects of the sprayed liquid on the postembryonal mite population, and on the ova was assessed after seven days, except in the case of N-(2-methyl-4-chlorphenyl)-N',N'-dimethylformamidine, in which results were evaluated after 14 days.

| Compound | Conc., Percent | Effect (lethal), Percent | |
|---|---|---|---|
| | | Postembr. | Ova |
| N-(2-methyl-4-chlorophenyl)-N'-methyl-formamidine | 0.1 | 100 | 100 |
| | 0.05 | 100 | 100 |
| | 0.02 | 100 | 100 |
| | 0.01 | 95 | 100 |
| N-(2-methyl-4-chlorophenyl)-N',N'-dimethylformamidine | 0.1 | 100 | 100 |
| | 0.05 | 100 | 100 |
| | 0.02 | 100 | 100 |
| | 0.01 | 95 | 100 |
| N-(2-methyl-4-chlorophenyl)-N',N'-dimethylformamidinium chloride | 0.1 | 100 | 100 |
| | 0.05 | 100 | 100 |
| | 0.02 | 100 | 100 |
| N-(2-methyl-4-chlorophenyl)-N',N'-diethylformamidine | 0.1 | 90 | 100 |
| | 0.05 | | 80 |
| N-(2-methyl-4-chlorophenyl)-N'-n-propylformamidine | 0.1 | 90 | 100 |
| | 0.05 | | 99 |
| N-(2-methyl-4-chlorophenyl)-N',N'-di-n-propylformamidine | 0.1 | 90 | 100 |
| | 0.05 | | 85 |
| N-(2-methyl-4-chlorophenyl)-N'-isobutylformamidine | 0.1 | 100 | 100 |
| | 0.05 | | 85 |
| N-(2-methyl-4-chlorophenyl)-N'-sec.-butylformamidine | 0.1 | 80 | 100 |
| | 0.05 | | 80 |
| N-phenyl-N',N'-dimethylformamidine | 0.1 | 0 | 0 |
| N-[2-methylphenyl]-N',N'-dimethyl-formamidinium chloride | 0.1 | 0 | 0 |
| N-[4-methylphenyl]-N',N'-dimethyl-formamidinium chloride | 0.1 | 0 | 0 |
| N-[3-chlorophenyl]-N',N'-dimethyl-formamidinium chloride | 0.1 | 0 | 0 |
| N-(3-chloro-4-methylphenyl)-N',N'-dimethylformamidine | 0.1 | 0 | 0 |
| N-(3,4-dischlorophenyl)-N',N'-diethyl-formamidinium chloride | 0.1 | 0 | 0 |

As is evident from the above tabulation, acaricidal effects are closely bound to the specific configuration of substituents in the phenyl radical.

EXAMPLE 3

Effects on ova of different ages

The effects of N-(2-methyl-4-chlorophenyl)-N',N'-dimethyl-formamidine on ova of *Tetranychus urticae* Koch were evaluated in a test based on the method of S. C. Hoyt, J. of Econ. Entomol. 54 (1) 12–16, 1961.

Circular disks of 18 mm. diameter were cut from bean leaves by means of a tubular laboratory cork borer. The leave disks were placed in open Petri dishes on foam plastic pads saturated with water which kept the disks from wilting. Ten adult females of *Tetranychus urticae* Koch were placed on each disk, and were removed after one day. On average, they left fifty eggs on each disk.

The eggs were sprayed with aqueous emulsions containing different amounts of the acaricidal agents. Spraying was performed by means of a conventional apparatus (dosing balance of M. Ehlers, Nachrichtenblatt des Pflanzenschutzdienstes, 5 (4) 60–62, 1953). Ova that had not hatched eight days after the beginning of the test were considered dead.

The percentages of dead ova in batches sprayed with emulsions containing the acaricidal agent in different concentrations at different periods after laying are listed below.

| | Age of ova, days | | | | |
|---|---|---|---|---|---|
| | 0–1 | 1–2 | 2–3 | 3–4 | 4–5 |
| Concentration of Active Agent in p.p.m.: | | | | | |
| 2 | 40 | 22 | 49 | 74 | 82 |
| 4 | 51 | 55 | 58 | 86 | 99 |
| 8 | 59 | 60 | 89 | 93 | 99 |
| 16 | 92 | 100 | 96 | 96 | 100 |

Obviously, many modifications and variations of the present invention are possible in the light of the above teachings. It is therefore to be understood that within the scope of the appended claims, the invention may be practiced otherwise than as specifically disclosed.

What is claimed is:

1. A method of destroying acarides which comprises applying to said acarides a lethal amount of a compound of the formula

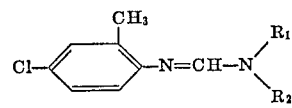

wherein $R_1$ is a member of the group consisting of hydrogen and an alkyl radical of one to four carbon atoms, and $R_2$ is an alkyl radical of between one and four carbon atoms.

2. A method according to claim 1, wherein the compound used is selected from the group consisting of N-(2-methyl-4-chlorophenyl)-N' methyl formamidine, N-(2-methyl-4-chlorophenyl)-N',N'-dimethylformamidine, N-(2-methyl-4-chlorophenyl)-N', N'-diethylformamidine, N-(2-methyl-4-chlorophenyl)-N' n-propylformamidine, N-(2-methyl-4-chlorophenyl)-N',N'-di-n-propylformamidine, N-(2-methyl-4-chlorophenyl)-N'-isobutyl formamidine, and N-(2-methyl-4-chlorophenyl)-N'-sec.butylformamidine.

References Cited

UNITED STATES PATENTS

| | | | |
|---|---|---|---|
| 3,084,192 | 4/1963 | Smathers | 260—564 |
| 3,189,648 | 6/1965 | Gerjovich | 260—564 |
| 2,417,985 | 3/1947 | Ladd | 167—30 |
| 3,108,038 | 10/1963 | Fielding et al. | 167—30 |
| 3,284,289 | 11/1966 | Duerr | 167—30 |

ALBERT T. MEYERS, *Primary Examiner.*

R. V. HINES, S. J. FRIEDMAN, *Assistant Examiners.*